(12) United States Patent
Yuan (10) Patent No.: US 11,938,992 B2
(45) Date of Patent: Mar. 26, 2024

(54) HANDLE HEIGHT ADJUSTING MECHANISM AND CHILD CARRIER THEREWITH

(71) Applicant: WONDERLAND SWITZERLAND AG, Steinhausen (CH)

(72) Inventor: Jialiang Yuan, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/909,005

(22) PCT Filed: Feb. 24, 2021

(86) PCT No.: PCT/EP2021/054584
§ 371 (c)(1),
(2) Date: Sep. 2, 2022

(87) PCT Pub. No.: WO2021/175679
PCT Pub. Date: Sep. 10, 2021

(65) Prior Publication Data
US 2023/0090957 A1    Mar. 23, 2023

(30) Foreign Application Priority Data
Mar. 3, 2020  (CN) .......................... 202010141345.4

(51) Int. Cl.
*B62B 5/06* (2006.01)
*B62B 9/20* (2006.01)

(52) U.S. Cl.
CPC ................ *B62B 5/064* (2013.01); *B62B 9/20* (2013.01); *B62B 2205/18* (2013.01)

(58) Field of Classification Search
CPC ....... B62B 5/064; B62B 9/20; B62B 2205/18; B62B 2205/22; B62B 5/067
See application file for complete search history.

(56) References Cited

U.S. PATENT DOCUMENTS

| | | | |
|---|---|---|---|
| 5,062,179 A * | 11/1991 | Huang | F16C 11/10 403/93 |
| 11,225,279 B2 * | 1/2022 | Horst | B62B 7/145 |
| 2017/0313337 A1 * | 11/2017 | Horst | B62B 7/044 |

FOREIGN PATENT DOCUMENTS

| CN | 104354750 A | * | 2/2015 |
|---|---|---|---|
| CN | 104354750 A | | 2/2015 |

(Continued)

OTHER PUBLICATIONS

Translated DE-102015105837-A1 (Year: 2023).*

(Continued)

*Primary Examiner* — James A Shriver, II
*Assistant Examiner* — Ian Bryce Shelton
(74) *Attorney, Agent, or Firm* — HAUPTMAN HAM, LLP (57) ABSTRACT

A handle height adjusting mechanism includes an upper fixing base, a lower fixing base pivoted to the upper fixing base, and an engaging component movably disposed between the upper fixing base and the lower fixing base and for engaging with the upper fixing base and the lower fixing base. The engaging component includes a protrusion. The handle height adjusting mechanism can adjust a handle height and prevent accidental folding operation of a child carrier for enhancing safety. The present application further discloses the child carrier having the handle height adjusting mechanism.

13 Claims, 9 Drawing Sheets

(56) References Cited

FOREIGN PATENT DOCUMENTS

| CN | 106741100 | A  | * | 5/2017  | |
|----|-----------|----|---|---------|-----------------|
| CN | 109278839 | A  | * | 1/2019  | ............ B62B 7/086 |
| CN | 209258210 | U  | * | 8/2019  | |
| CN | 110329334 | A  | * | 10/2019 | |
| CN | 111086548 | A  | * | 5/2020  | |
| DE | 202007002933 | U1 |  | 5/2007  | |
| DE | 202007002933 | U1 | * | 6/2007  | ............... B62B 5/00 |
| DE | 102015105837 | A1 | * | 10/2016 | ........... A01D 34/824 |
| DE | 102015105837 | A1 |  | 10/2016 | |
| GB | 2446806   | A  |   | 8/2008  | |

OTHER PUBLICATIONS

Translated CN-104354750-A (Year: 2023).*
International Search Report and Written Opinion issued in corresponding International Application No. PCT/EP2021/054584, dated May 6, 2021, pp. 1-12, European Patent Office, Rijswijk, Netherlands.

* cited by examiner

HANDLE HEIGHT ADJUSTING MECHANISM AND CHILD CARRIER THEREWITH

CROSS REFERENCE TO RELATED APPLICATIONS

This is a 371 U.S. National Phase of International Application No. PCT/EP2021/054584, filed on Feb. 24, 2021, which claims the benefit of CN Patent Application No. 202010141345.4, and the contents of this application are incorporated herein by reference.

FIELD OF THE APPLICATION

The present application relates to a handle height adjusting mechanism and a child carrier.

BACKGROUND OF THE APPLICATION

An upper handle and a lower handle of a conventional child carrier are connected to each other through an adjustment mechanism. When the upper handle rotates in a forward direction, a handle height can be adjusted. When the upper handle rotates in a reverse direction to exceed an adjusted height angle, the upper handle can be linked with a frame releasing mechanism, so that the frame releasing mechanism can unlock a frame of the child carrier, and then the frame can be folded.

SUMMARY OF THE APPLICATION

This is mind, the present application aims at providing a handle height adjusting mechanism and a child carrier which can adjust a handle height and prevent accidental folding operation for enhancing safety.

This is achieved by a handle height adjusting mechanism and a child carrier according to claims 1 and 12. The dependent claims pertain to corresponding further developments and improvements.

As will be seen more clearly from the detail description following below, the claimed handle height adjusting mechanism includes an upper fixing base, a lower fixing base pivoted to the upper fixing base, and an engaging component movably disposed between the upper fixing base and the lower fixing base and for engaging with the upper fixing base and the lower fixing base, wherein the engaging component includes a protrusion.

Furthermore, the claimed child carrier includes an upper handle, a frame, and the handle height adjusting mechanism. The frame includes a lower handle, the upper handle is connected to the upper fixing base, and the lower handle is connected to the lower fixing base.

In summary, the present application provides the protrusion on the engaging component and the first engaging portion on the upper fixing base, and the width of the first engaging portion is greater than the width of the protrusion, so that the upper fixing base can be rotated in the first rotating direction, and the upper handle can be rotated and adjusted within a certain angular range to achieve the purpose of adjusting the handle height. In addition, the blocking portion on the side of the first engaging portion can block the rotation of the upper fixing base in a direction opposite to the first rotating direction, thereby preventing accidental folding of the child carrier, so as to improve the safety of use. Furthermore, the second engaging portion on the upper fixing base can engage with the protrusion when the upper handle is folded, so as to prevent the upper handle from being opened up accidentally, and the upper handle can also be released quickly, so as to enhance the safety of use.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

In the following, the application is further illustrated by way of example, taking reference to the accompanying drawings. Thereof

DETAILED DESCRIPTION

In order to illustrate technical specifications and structural features as well as achieved purposes and effects of the present application, relevant embodiments and figures are described as follows.

In the following detailed description of the preferred embodiments, reference is made to the accompanying drawings which form a part hereof, and in which is shown by way of illustration specific embodiments in which the application may be practiced. In this regard, directional terminology, such as "top," "bottom," "front," "back," etc., is used with reference to the orientation of the Figure(s) being described. The members of the present application can be positioned in a number of different orientations. As such, the directional terminology is used for purposes of illustration and is in no way limiting. Accordingly, the drawings and descriptions will be regarded as illustrative in nature and not as restrictive.

Figure 1:
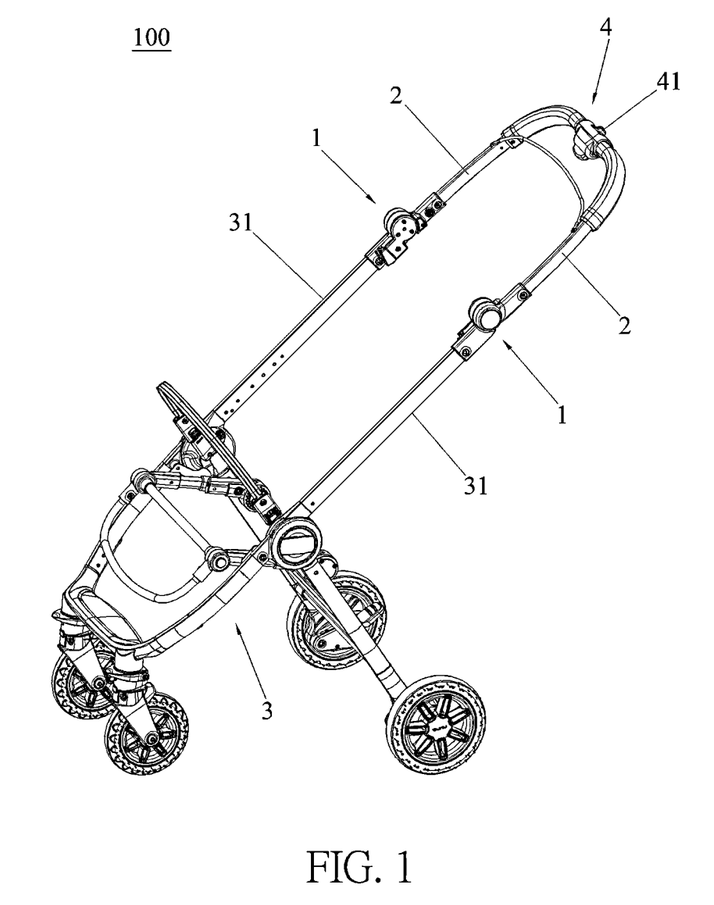
FIG. 1 is a schematic drawing of a child carrier according to an embodiment of the present application.
Figure 2:
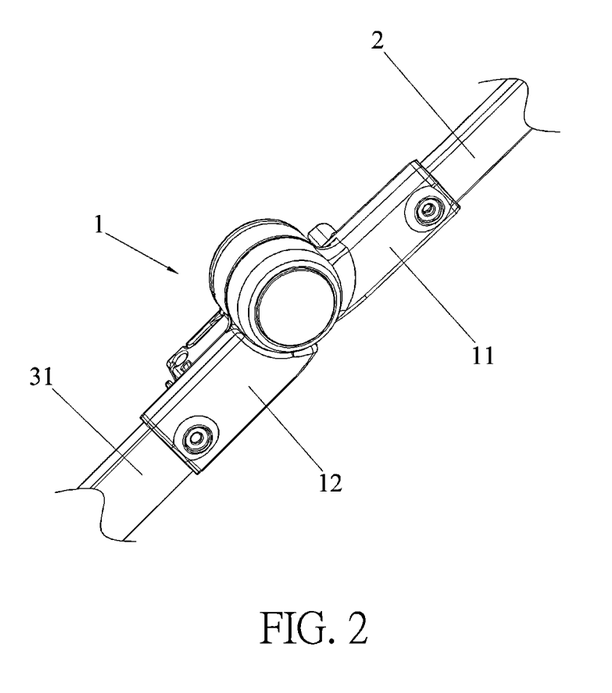
FIG. 2 is a schematic drawing of a handle height adjusting mechanism of the child carrier according to the embodiment of the present application.
Figure 3:
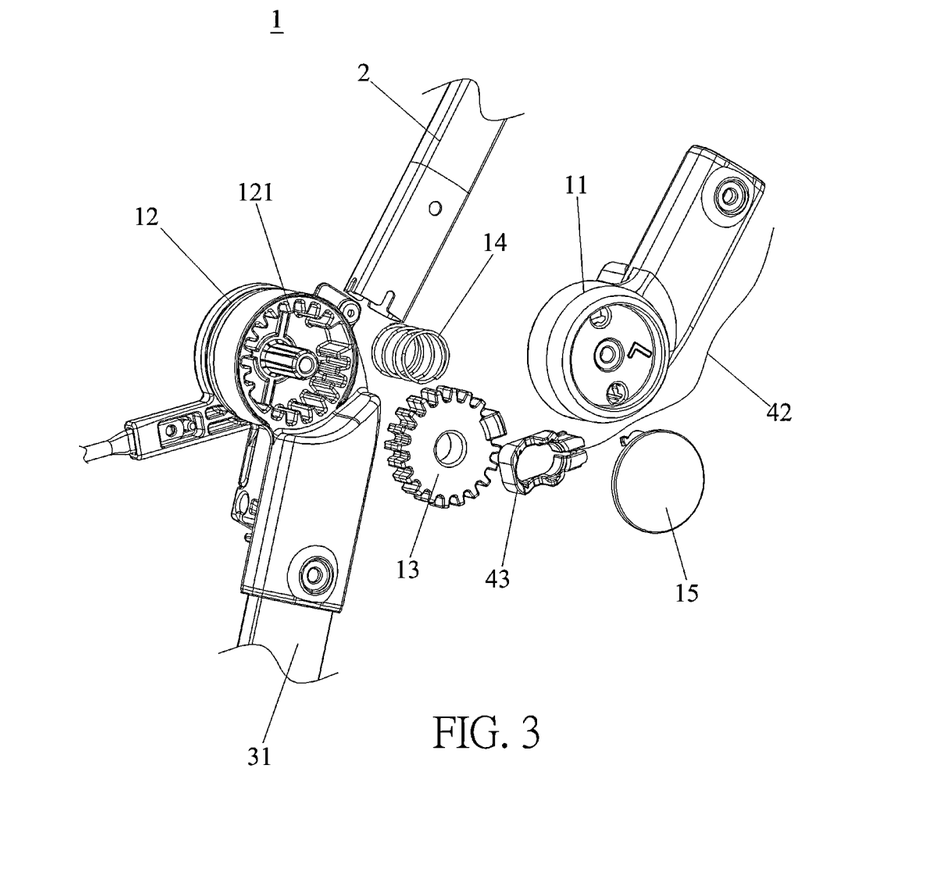
FIG. 3 is an exploded diagram of the handle height adjusting mechanism according to the embodiment of the present application.

Please refer to FIG. 1 to FIG. 3. FIG. 1 is a schematic drawing of a child carrier 100 according to an embodiment of the present application. FIG. 2 is a schematic drawing of a handle height adjusting mechanism 1 of the child carrier 100 according to the embodiment of the present application. FIG. 3 is an exploded diagram of the handle height adjusting mechanism 1 according to the embodiment of the present application. The child carrier 100 can be a stroller. The child carrier 100 includes the handle height adjusting mechanism 1, an upper handle 2, a frame 3 and a folding driving mechanism 4. The frame 3 includes a lower handle 31. The handle height adjusting mechanism 1 includes an upper fixing base 11, a lower fixing base 12 pivoted to the upper fixing base 11 by a central shaft, an engaging component 13 movably disposed along the central shaft and between the upper fixing base 11 and the lower fixing base 12 and for engaging with the upper fixing base 11 and the lower fixing base 12, and a recovering component 14 installed between the lower fixing base 12 and the engaging component 13. The recovering component 14 can be a resilient structure, such as a compression spring. The upper handle 2 and the upper fixing base 11 are fixedly connected to each other. The folding driving assembly 4 includes an operating mechanism 41, a drawing component 42 and a driving component 43. The operating mechanism 41 is installed on the upper handle 2, the drawing component 42 is disposed between the driving component 43 and the operating mechanism 41, and the driving component 43 is disposed on a side of the engaging component 13 and for driving the engaging component 13 to separate from the upper fixing base 11, so as to unlock the upper handle 2 and allow the upper handle 2 to fold close to the lower handle 31, thereby folding the entire frame 3. The driving component 43 is disposed between the engaging component 13 and the upper handle 2. The detailed structure and folding operation of the frame 3 are omitted herein.

Figure 4:
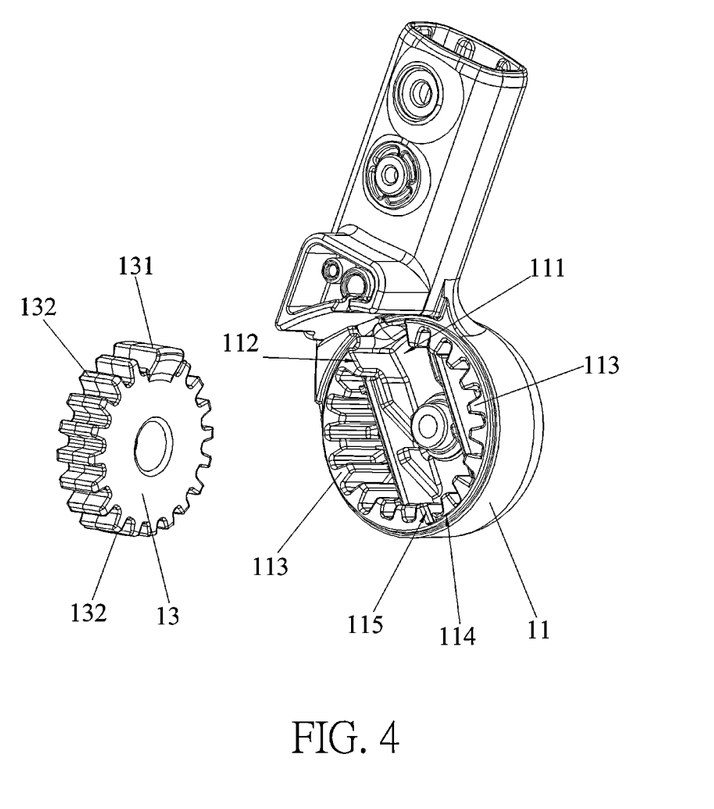
FIG. 4 is a schematic drawing of an engaging component of the handle height adjusting mechanism and an upper handle according to the embodiment of the present application.
Figure 5:
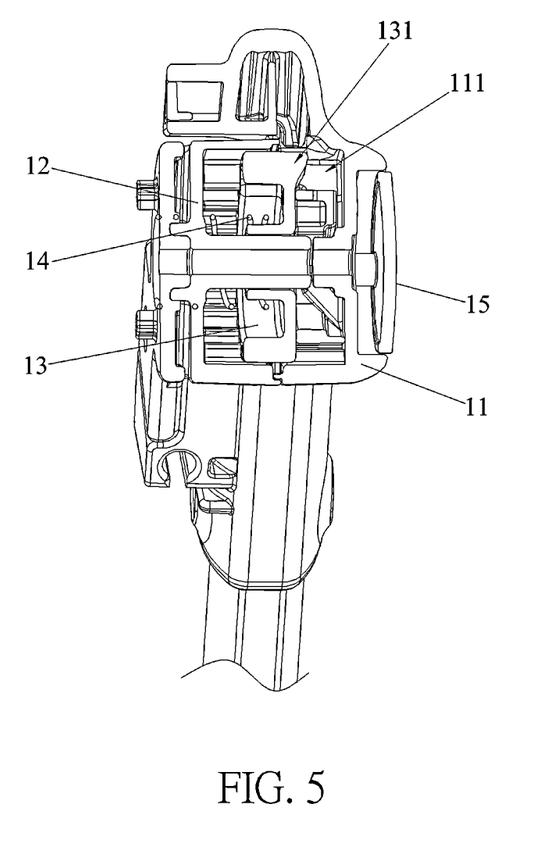
FIG. 5 is a sectional diagram of the handle height adjusting mechanism in a locking status according to the embodiment of the present application.
Figure 6:
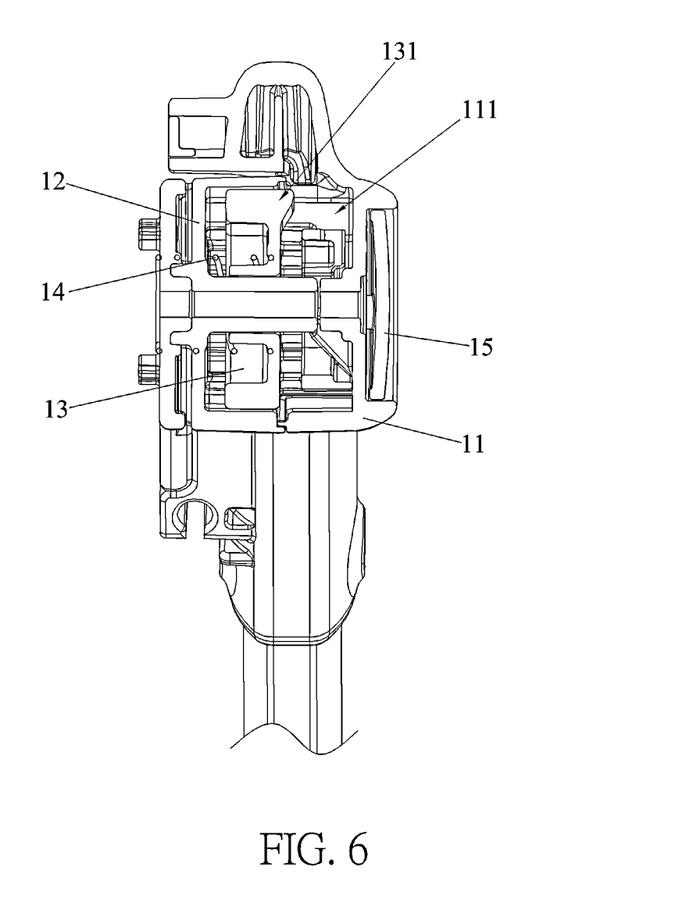
FIG. 6 is a sectional diagram of the handle height adjusting mechanism in a releasing status according to the embodiment of the present application.

Please refer to FIG. 2 to FIG. 6. FIG. 4 is a schematic drawing of the engaging component 13 of the handle height adjusting mechanism 1 and the upper handle 2 according to the embodiment of the present application. FIG. 5 is a sectional diagram of the handle height adjusting mechanism 1 in a locking status according to the embodiment of the present application. FIG. 6 is a sectional diagram of the handle height adjusting mechanism 1 in a releasing status according to the embodiment of the present application. The engaging component 13 includes a protrusion 131 protruding outwardly. The upper fixing base 11 includes a first engaging portion 111 disposed on an inner wall of the upper fixing base 11, and a width of the first engaging portion 111 is greater than a width of the protrusion 131. A blocking portion 112 is disposed on a side of the first engaging portion 111 and for abutting against the protrusion 131, and the upper fixing base 11 is allowed to rotate within a predetermined angular range when the engaging component 12 separates from the upper fixing base 11 and the protrusion 131 still engages with the first engaging portion 111. In this embodiment, the upper fixing base 11 can rotate in a first rotating direction, so that the upper handle 2 can rotate downwardly relative to the lower handle 31 for angular adjustment, so as to adjust a height of the upper handle 2. The blocking portion 112 can block the upper fixing base 11 from rotating in a direction opposite to the first rotating direction, that is, the blocking portion 112 can block the upper handle 2 from rotating upwardly relative to the lower handle 31. The engaging portion 13 can be a gear and includes a plurality of gear teeth 132. The width of the protrusion 131 can be greater than a width of each gear tooth 132. The upper fixing base 11 includes at least one first gear tooth 113 circumferentially disposed on the inner wall of the upper fixing base 11, and the lower fixing base 12 includes at least one second gear tooth 121 circumferentially disposed on an inner wall of the lower fixing base 12. In this embodiment, the upper fixing base 11 can include a plurality of first gear teeth 113, and the lower fixing base 12 can include a plurality of second gear teeth 121. The gear can engage with the second gear teeth 121, and the gear can engage with the first gear teeth 113 when the gear slides into the upper fixing base 11. Through the engagement of the gear teeth 132 of the gear with the first gear teeth 113 and the second gear teeth 121, the upper fixing base 11 and the lower fixing base 12 can be fixed more stably and firmly. The width of the first engaging portion 111 can be equal to a sum of the width of the protrusion 131 and a tooth pitch of the two gear teeth 132 of the engaging component 13. For example, the width of the first engaging portion 111 can be equal to a sum of the width of the protrusion 131 and a tooth pitch of the two adjacent gear teeth 132 of the engaging component 13. Therefore, after rotation of the upper fixing base 11, the protrusion 131 and one of the gear teeth 132 of the engaging component 13 can be just engaged with the first engaging portion 111 to ensure stable engaging connection between the engaging component 13 and the upper fixing base 11.

Besides, the upper fixing base 11 includes a second engaging portion 114 disposed on the inner wall of the upper fixing base 11 and for engaging with the protrusion 131, and the first engaging portion 111 and the second engaging portion 114 can be separated by 180 degrees. A depth of the second engaging portion 114 can be smaller than a thickness of the first engaging portion 111. For example, the second engaging portion 114 can be designed to just accommodate the protrusion 131, so that when the protrusion 131 and the second engaging portion 114 are engaged with each other, the gear teeth 132 of the engaging component 13 will not engage with the first gear teeth 113, which facilitates the engaging component 13 to be pushed away from the upper fixing base 11, and the upper fixing base 11 can be unlocked quickly. By the cooperation of the second engaging portion 114 and the protrusion 131, the upper fixing base 11 can be locked in a folded status when the upper fixing base 11 is folded relative to the lower fixing base 12, so as to prevent the upper fixing base 11 from being accidentally opened up.

Specifically, a first driving inclined surface 115 is formed on a side of the second engaging portion 114. When the second engaging portion 114 engages with the protrusion 131, the first driving inclined surface 115 can drive the protrusion 131 to separate from the second engaging portion 114 by turning over the upper handle 2, so as to allow the upper fixing base 11 to rotate in the first rotating direction, so that the upper handle 2 can be opened relative to the lower handle 31. The protrusion 131 can be automatically separated from the second engaging portion 114 by the first driving inclined surface 115, so that the upper fixing base 11 can be automatically unlocked relative to the lower fixing base 12, thereby enhancing the convenience of operation.

Besides, the handle height adjusting mechanism 1 includes an operating component 15 movably disposed on a side of the upper fixing base 11 or the lower fixing base 12 and for abutting against the engaging component 13, so as to drive the engaging component 13 to move along an axial direction of the engaging component 13. The configuration of the operating component 15 can push the engaging component 13 more easily, so as to enhance the convenience of operation.

Figure 7:
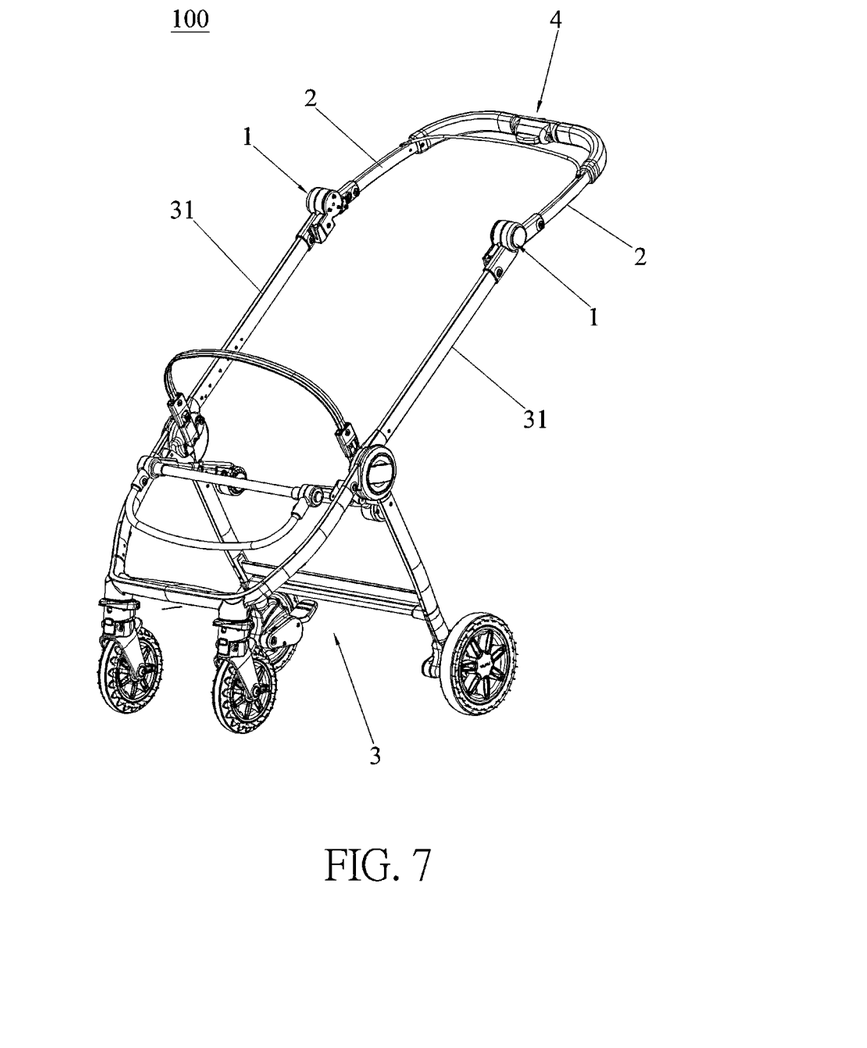
FIG. 7 is a schematic drawing of the child carrier after adjusting a handle height by the handle height adjusting mechanism according to the embodiment of the present application.

In summary, detailed description of the handle height adjustment of the child carrier 100 of the present application is introduced as follows. Please refer to FIG. 1 to FIG. 7. FIG. 7 is a schematic drawing of the child carrier 100 after adjusting the handle height by the handle height adjusting mechanism 1 according to the embodiment of the present application. First, a user can press the operating component 15 to push the operating component 15 against the engaging component 13, so that the gear teeth 132 of the engaging component 13 can be separated from the first gear teeth 113 of the upper fixing base 11 but still engaged with the second gear teeth 121 of the lower fixing base 12. The gear tooth 132 originally located in the first engaging portion 111 and adjacent to a side of the protrusion 131 can be separated from the first engaging portion 111, but the protrusion 131 is still located in the first engaging portion 111 and close to a side of the blocking portion 112. At this time, the upper fixing base 11 can be rotated in the first rotating direction, so that the protrusion 131 can be moved away from the blocking portion 112 and moved from an inner side of the first engaging portion 111 to another inner side of the first engaging portion 111. The upper fixing base 11 cannot rotate in the direction opposite to the first rotating direction due to the blocking of the blocking portion 112. In the above process, the upper fixing base 11 can rotate downwardly to adjust the handle height. Finally, after the user releases the operating component 15, the protrusion 131 and the gear tooth 132 adjacent to another side of the protrusion 131 can simultaneously engage inside the first engaging portion 111 by the resilient restoring force of the recovering component 14 acting on the engaging component 13, and other gear teeth 132 of the engaging component 13 respectively engage with the first gear teeth 113 and the second gear teeth 121, so that the upper fixing base 11 can be locked with the lower fixing base 12 again.

Figure 8:
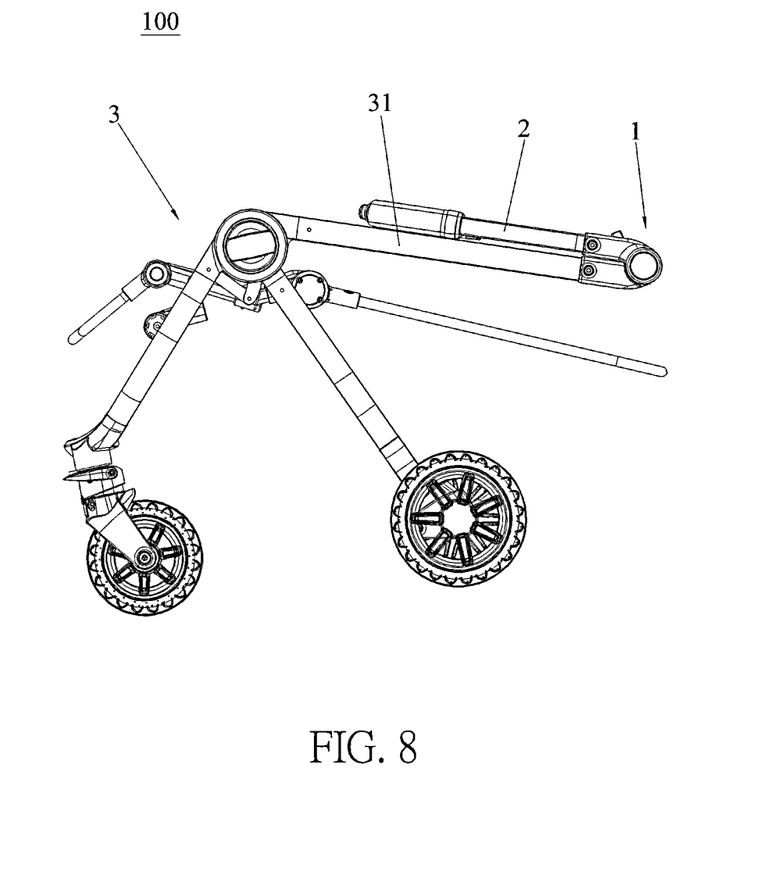
FIG. 8 is a schematic drawing of the folding child carrier according to the embodiment of the present application.
Figure 9:
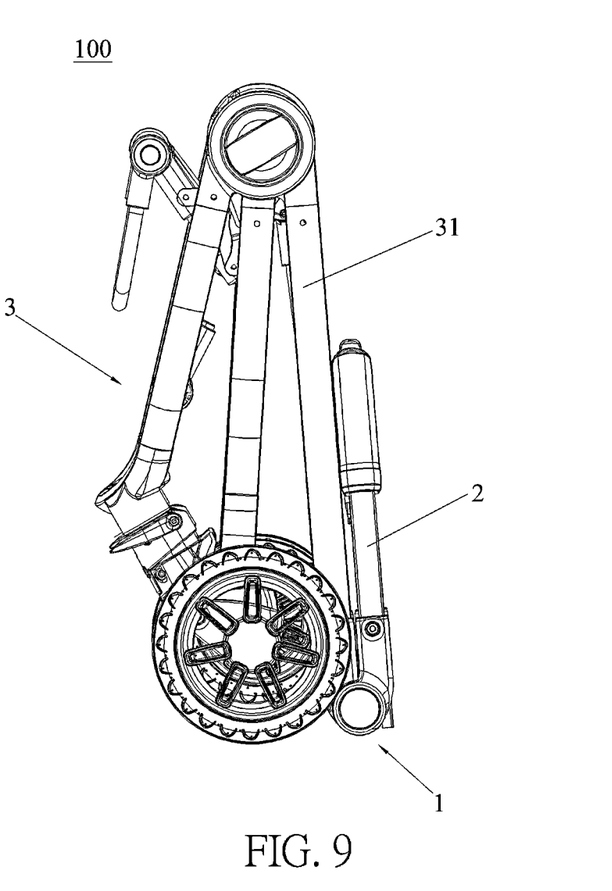
FIG. 9 is a schematic drawing of the folded child carrier according to the embodiment of the present application.

Please refer to FIG. 8 and FIG. 9. FIG. 8 is a schematic drawing of the folding child carrier 100 according to the embodiment of the present application. FIG. 9 is a schematic drawing of the folded child carrier 100 according to the embodiment of the present application. When the child carrier 100 is to be folded, the user can operate the operating mechanism 41 to drive the driving component 43 through the drawing component 42 so that the driving component 43 moves to push the engaging component 13 for completely separating the engaging component 13 from the upper fixing base 11 and completely separating the protrusion 131 from the first engaging portion 111. At this time, the upper fixing base 11 can be unlocked, and the upper handle 2 can rotate in the direction opposite to the first rotating direction, that is, the upper handle 2 can rotate upwardly relative to the lower handle 31. When the upper handle 2 is folded, the whole child carrier 100 can be folded accordingly. When the upper handle 2 is folded close to the lower handle 31, the protrusion 131 can engage with the second engaging portion 114 by the resilient restoring force of the recovering component 14 so as to prevent the upper handle 2 from being opened up accidentally.

The conventional upper handle might turn excessively due to improper operation when adjusting the handle height, which releases the frame releasing mechanism accidentally, thereby accidentally folding the frame and causing danger. In contrast to the related art, the present application provides the protrusion 131 on the engaging component 13 and the first engaging portion 111 on the upper fixing base 11, and the width of the first engaging portion 111 is greater than the width of the protrusion 131, so that the upper fixing base 11 can be rotated in the first rotating direction, and the upper handle 2 can be rotated and adjusted within a certain angular range to achieve the purpose of adjusting the handle height. In addition, the blocking portion 112 on the side of the first engaging portion 111 can block the rotation of the upper fixing base 11 in the direction opposite to the first rotating direction, thereby preventing accidental folding operation of the child carrier 100, so as to improve the safety of use.

Furthermore, the second engaging portion 114 on the upper fixing base 11 can engage with the protrusion 131 when the upper handle 2 is folded, so as to prevent the upper handle 2 from being opened up accidentally, and the upper handle 2 can also be released quickly, so as to enhance the safety of use.

Those skilled in the art will readily observe that numerous modifications and alterations of the device and method may be made while retaining the teachings of the application. Accordingly, the above disclosure should be construed as limited only by the metes and bounds of the appended claims.

The invention claimed is:

1. A handle height adjusting mechanism comprising:
an upper fixing base;
a lower fixing base pivotable to the upper fixing base; and
an engaging component movably disposed between the upper fixing base and the lower fixing base in an axial direction of the engaging component and for engaging with the upper fixing base and the lower fixing base, the engaging component comprising a protrusion protruding in the axial direction,
wherein
the engaging component is a gear including a plurality of gear teeth on a circumference of the gear, and
the protrusion is at least partially positioned between two adjacent gear teeth among the plurality of gear teeth and on the circumference of the gear.

2. The handle height adjusting mechanism of claim 1, wherein the upper fixing base comprises a first engaging portion, and a width of the first engaging portion is greater than a width of the protrusion.

3. The handle height adjusting mechanism of claim 2, wherein a blocking portion is disposed on a side of the first engaging portion and for abutting against the protrusion, and the upper fixing base is allowed to rotate within a predetermined angular range when the engaging component separates from the upper fixing base and the protrusion engages with the first engaging portion.

4. The handle height adjusting mechanism of claim 3, wherein the upper fixing base comprises at least one first gear tooth, the lower fixing base comprises at least one second gear tooth for engaging with the gear, and the gear engages with the at least one first gear tooth when the gear slides into the upper fixing base.

5. A handle height adjusting mechanism comprising:
an upper fixing base;
a lower fixing base pivoted to the upper fixing base; and
an engaging component movably disposed between the upper fixing base and the lower fixing base and for engaging with the upper fixing base and the lower fixing base, the engaging component comprising a protrusion,
wherein the upper fixing base comprises a first engaging portion, and a width of the first engaging portion is greater than a width of the protrusion,
wherein a blocking portion is disposed on a side of the first engaging portion and for abutting against the protrusion, and the upper fixing base is allowed to rotate within a predetermined angular range when the engaging component separates from the upper fixing base and the protrusion engages with the first engaging portion,
wherein the engaging component is a gear, the upper fixing base comprises at least one first gear tooth, the lower fixing base comprises at least one second gear tooth for engaging with the gear, and the gear engages with the at least one first gear tooth when the gear slides into the upper fixing base, and wherein the width of the first engaging portion is equal to a sum of the width of the protrusion and a tooth pitch of the engaging component.

6. The handle height adjusting mechanism of claim 2, wherein the upper fixing base comprises a second engaging portion for engaging with the protrusion.

7. A handle height adjusting mechanism comprising:
an upper fixing base;
a lower fixing base pivoted to the upper fixing base; and
an engaging component movably disposed between the upper fixing base and the lower fixing base and for engaging with the upper fixing base and the lower fixing base, the engaging component comprising a protrusion,
wherein the upper fixing base comprises a first engaging portion, and a width of the first engaging portion is greater than a width of the protrusion,
wherein the upper fixing base comprises a second engaging portion for engaging with the protrusion,
wherein a first driving inclined surface is formed on a side of the second engaging portion, and when the second engaging portion engages with the protrusion, the first driving inclined surface is configured to drive the protrusion to separate from the second engaging portion so as to allow the upper fixing base to rotate in a first rotating direction.

8. The handle height adjusting mechanism of claim 6, wherein the first engaging portion and the second engaging portion are separated by 180 degrees.

9. The handle height adjusting mechanism of claim 1, further comprising a recovering component installed between the lower fixing base and the engaging component and for driving the protrusion to engage with the upper fixing base.

10. The handle height adjusting mechanism of claim 9, wherein the recovering component is a compression spring.

11. The handle height adjusting mechanism of claim 1, further comprising an operating component movably disposed on a side of the upper fixing base or the lower fixing base and for driving the engaging component to move along the axial direction.

12. A child carrier comprising an upper handle, a frame, and the handle height adjusting mechanism of claim 1, the frame comprising a lower handle, the upper handle being connected to the upper fixing base, and the lower handle being connected to the lower fixing base.

13. The child carrier of claim 12, further comprising a folding driving assembly comprising a driving component, a drawing component and an operating mechanism, the operating mechanism being installed on the upper handle, the drawing component being disposed between the driving component and the operating mechanism, and the driving component being disposed on a side of the engaging component and for driving the engaging component to separate from the upper fixing base so as to fold the upper handle.

* * * * *